United States Patent [11] 3,626,970

[72] Inventors Phillip T. Jones
 Los Altos;
 Dresden G. Smith, San Jose, both of Calif.
[21] Appl. No. 109
[22] Filed Jan. 2, 1970
[45] Patented Dec. 14, 1971
[73] Assignee Aqua-Mec Inc.

[54] AIR VOLUME CONTROL FOR HYDROPNEUMATIC TANKS
 3 Claims, 6 Drawing Figs.
[52] U.S. Cl. ................................................. 137/209, 137/392
[51] Int. Cl. ................................................. F04f 1/06, B67d 5/54
[50] Field of Search ...................................... 137/209, 210, 392

[56] References Cited
UNITED STATES PATENTS

| | | | |
|---|---|---|---|
| 2,318,066 | 5/1943 | Dodd | 137/209 X |
| 2,932,315 | 4/1960 | Jarzembski | 137/392 |
| 3,214,643 | 10/1965 | Borell | 137/392 X |
| 3,335,963 | 8/1967 | Weis | 137/209 X |

*Primary Examiner*—Alan Cohan
*Attorney*—Allen & Chromy

ABSTRACT: An air volume control for hydropneumatic tanks employing a motor-driven air compressor which is controlled by an air pressure switch and an electronic liquid level responsive switch. These switches are mounted in a common housing which is attached to the top of the hydropneumatic tank by a pipe nipple. A wire with an electrode at its lower end extends into the tank through an insulator positioned in the nipple to sense the water level in the tank. A check valve in the air compressor exhaust line isolates the air compressor from tank pressure when the compressor is not pumping and a safety relief valve connected to the air pressure line insures against overpressurization of the tank by the air compressor in the event the pressure switch fails to open or if for some other reason the air compressor is caused to run when the preset pressure is exceeded. The air pressure switch and electronic liquid level control switch are mounted as a unit and the motor-driven air compressor may be included in this unit or a separate motor-driven air compressor may be provided. This control may be mounted either on the top of the hydropneumatic tank or on a side of the tank at the water line, in which case an aspirating electrode is substituted for the electrode wire. A part of the aspirating electrode insulator is adapted to flex when the pressure in the tank increases or decreases so that minerals deposited thereon break off as rapidly as they form.

INVENTORS.
PHILLIP T. JONES
DRESDEN G. SMITH

*INVENTORS.*
PHILLIP T. JONES
DRESDEN G. SMITH
BY
*Allen and Chromy*
ATTORNEYS

AIR VOLUME CONTROL FOR HYDROPNEUMATIC TANKS

DESCRIPTION OF THE INVENTION

This invention relates to an air volume control for hydropneumatic tanks.

An object of this invention is to provide an improved air volume control for hydropneumatic tank which is provided with a pressure switch, liquid level control switch and a motor-driven air compressor all in a common housing mounted on the top or side of the tank and is economical to manufacture and install and which is reliable in operation to maintain an optimum air volume in the tank.

Another object of this invention is to provide an improved air volume control for hydropneumatic tanks which senses the water level and tank pressure and determines when the charge of air in the tank must be supplemented.

Still another object of this invention is to provide an improved air volume control for hydropneumatic tanks in which the electric motor driving the air compressor is connected in series with an air pressure responsive switch and a switch responsive to the electronic liquid level sensing device.

Another object of this invention is to provide an improved air volume control for hydropneumatic tanks which supplies compressed air to the tank after the water level therein is at a predetermined height and if the air pressure therein is at a lower than predetermined value in which case the air compressor will run until either the water level is lowered by water being drawn from the tank or until the air pressure in the tank exceeds the pressure setting of the switch.

Other and further objects of this invention will be apparent to those skilled in the art to which it relates from the following claims, specification and drawing.

In accordance with this invention there is provided a device which senses the water level and air pressure in the water tank and controls the electric motor driving the air compressor to supply compressed air to the tank when the charge of air therein must be supplemented. This device employs a switch which is responsive to the air pressure in the tank and another switch which is controlled by an electronic circuit responsive to the water level in the tank. Both of these switches are connected in series with the electric motor driving the air compressor. However, the pressure-responsive switch is normally closed unless the air pressure in the tank is sufficient to open it, while the switch responsive to the water level in the tank is normally open. Thus, if the water level in the tank is at a predetermined height but the air pressure is below a preset value the air compressor will be turned on and will furnish compressed air to the tank until the preset value is reached. On the other hand if the water level is below the predetermined height the air compressor will not be turned on whether or not the air pressure is high or low until the water level in the tank is brought to a predetermined height by the water pump, and then if the air pressure is low the air compressor will be turned on to bring it up to the preset value.

Further details and features of this invention will be set forth in the specification, claims and drawing in which, briefly:

Figure 1:
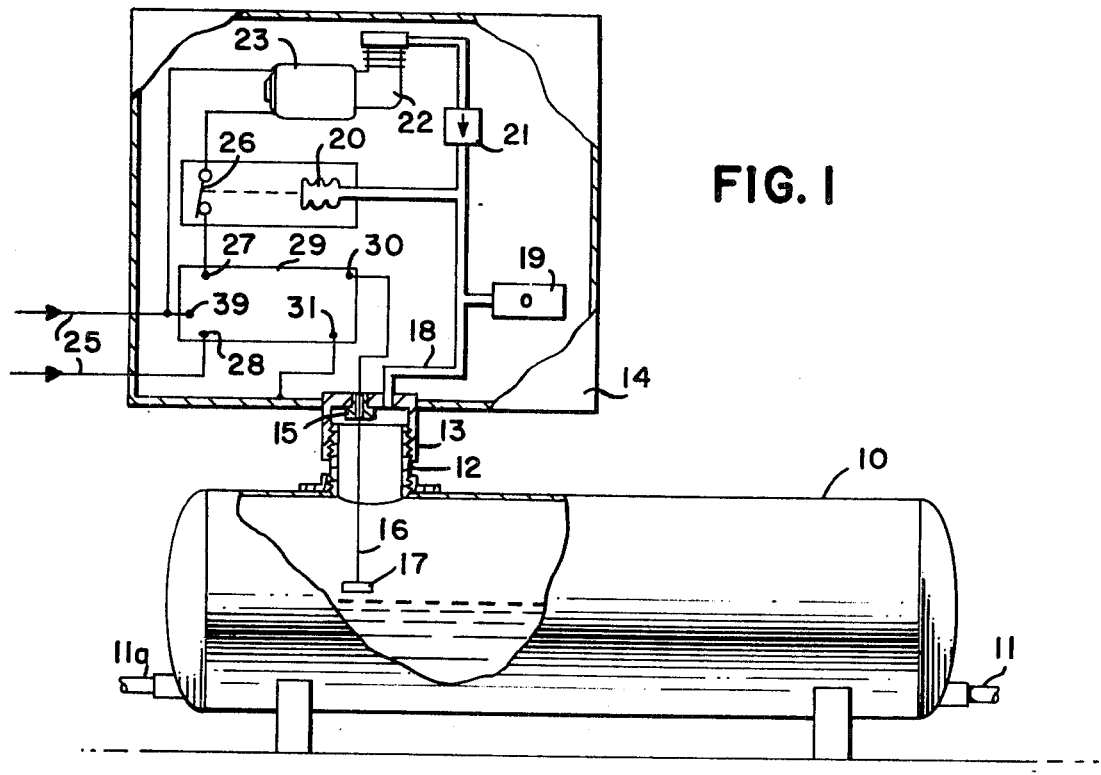
FIG. 1 is a view in side elevation partially in section of an embodiment of this invention in which the air compressor is supported in a housing on the top of the tank together with the controls.
Figure 2:
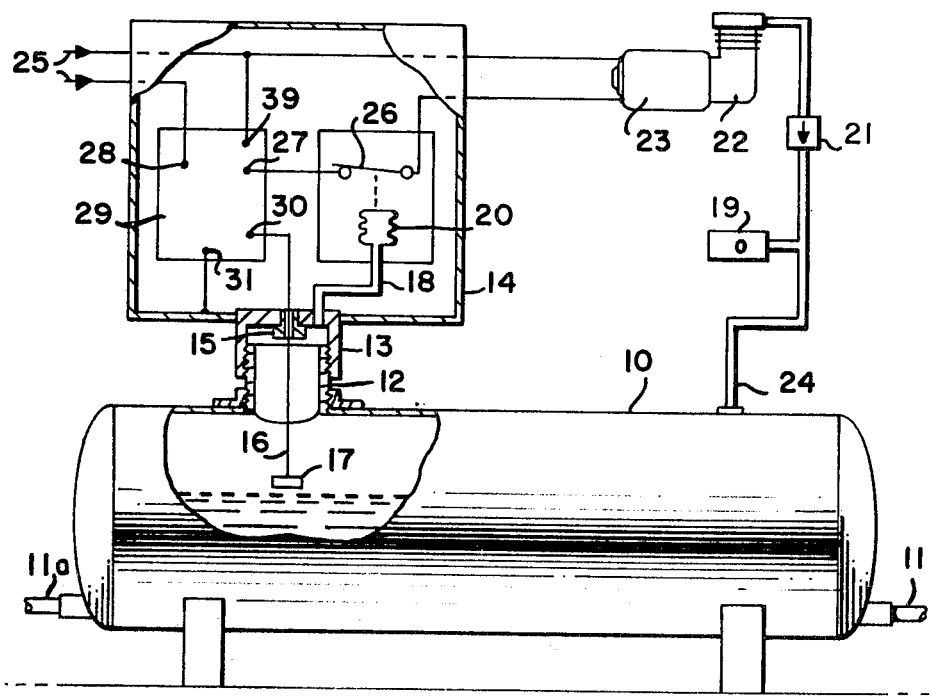
FIG. 2 is a view in side elevation of an embodiment of this invention in which the air compressor is mounted separately from the mounting of the controls.

Referring to the drawing in detail, reference numeral 10 designates a conventional water tank which is provided with a water inlet 11 that is connected to a conventional motor driven water pump (not shown). The top of the tank 10 shown in FIGS. 1 and 2 is provided with a threaded flange into which a short length of pipe 12 is threaded. The member 13, to which the control enclosure 14 is attached, is threaded to the short length of pipe 12 so that the enclosure 14 is supported thereby on the top of the water tank 10. The member 13 is provided with a feed-through insulator 15 through which the wire 16, which supports the water-sensing electrode 17, extends. Wire 16 supports the electrode 17 at a predetermined level in the tank 10 and this level may be adjusted if desired. Member 13 is also provided with a hole for receiving the air pressure line 18 which is connected to the pressure relief valve 19, to the pressure switch actuating bellows or diaphragm 20, to the check valve 21 and to the air compressor 22 as shown in FIG. 1. The air pressure line 18 is connected only to the switch-actuating bellows 20 in the arrangement shown in FIG. 2 since the compressor 22 and motor 23 are located outside of the enclosure 14 in this arrangement and a separate air pressure line 24 is provided between the compressor 22 and the tank.

The motor 23 is connected to the 230-volt 60-Hertz line 25 through the air pressure switch 26 and through the terminals 27 and 28 of the control circuit 29. Additional terminals 30 and 31 are provided to the control circuit 29 and the wire 16 is connected to terminal 30 while terminal 31 is grounded to the enclosure 14 and to the water tank 10.

Figure 4:
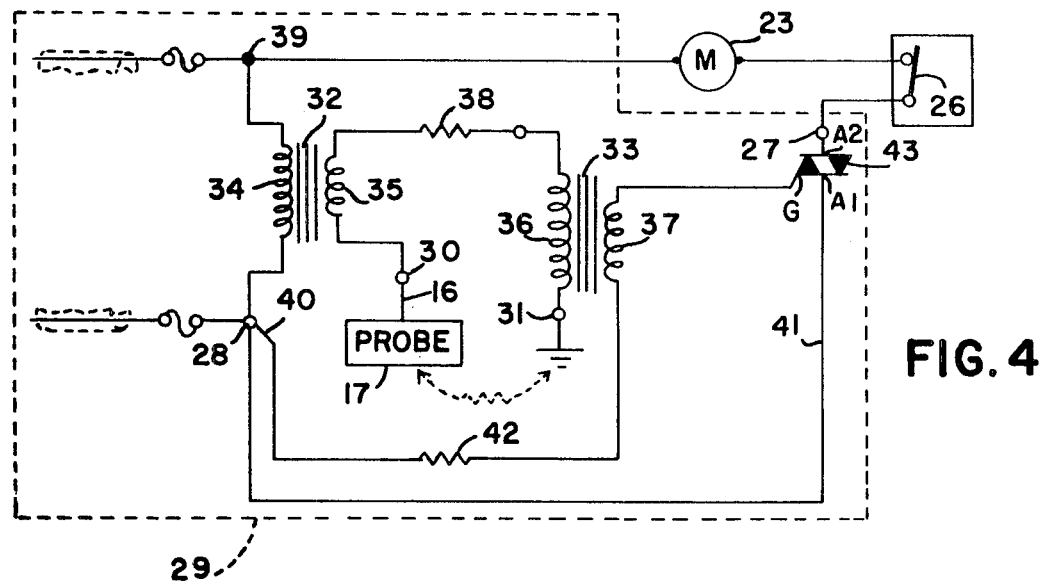
FIG. 4 is a schematic wiring diagram of the electrical circuit connected to the water probe which is positioned inside of the tank.

The wiring diagram provided to the electrical control circuit 29 is illustrated in FIG. 4. The control circuit 29 is provided with two transformers 32 and 33. Transformer 32 is provided with windings 34 and 35 and transformer 33 is provided with windings 36 and 37. One terminal of winding 35 is connected to the terminal 30 and to the wire 16 which leads to the water probe 17. The other terminal of winding 35 is connected through a resistor 38 to one terminal of winding 36 of transformer 33. The other terminal of winding 36 is connected to ground.

The primary 34 of transformer 32 is connected to the terminals 28 and 39 which are connected to the 230-volt lines 25. Two additional lines 40 and 41 are connected to the primary 34. Line 40 is connected to the bottom terminal of the secondary 37 of transformer 33 through resistor 42. Line 41 is connected to the load terminal A1 of the gate-controlled AC switch 43 which may be of the type sold commercially under the name "Triac." The gate G of switch 43 is connected to the top terminal of the secondary 37 of transformer 33. The other load terminal A2 of the gate controlled AC switch 43 is connected to the terminal 27.

Thus alternating current flows through the AC switch 43 when the gate G is turned on, that is when the water in the tank 10 closes the circuit between the probe electrode 17 and the metal tank so that electric current flows between the secondary 35 of transformer 32 and the primary 36 of transformer 33 and the secondary 37 of transformer 33 supplies an electric current to the gate of the AC switch 43. The current to the electric motor 23 is supplied through the control circuit 29 and the air pressure switch 26. Air pressure switch 26 is normally closed unless the air pressure in the tank 10 is sufficient to actuate the expandable chamber 20 and open this switch.

Figure 3:
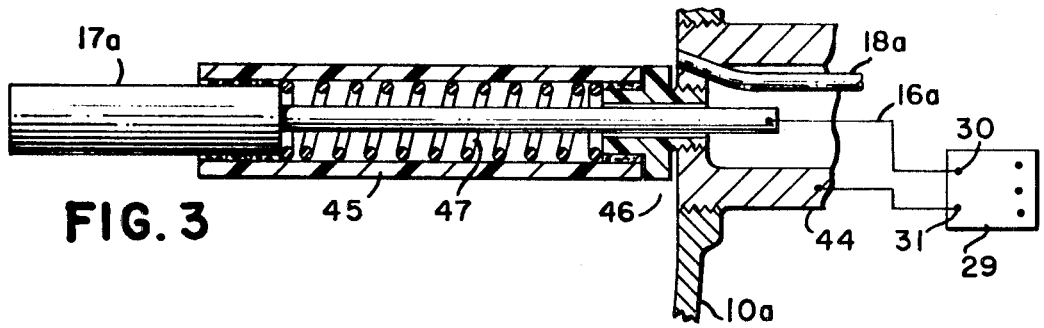
FIG. 3 is a view partially in section showing the air volume control mounted on a side of the water tank.
Figure 6:
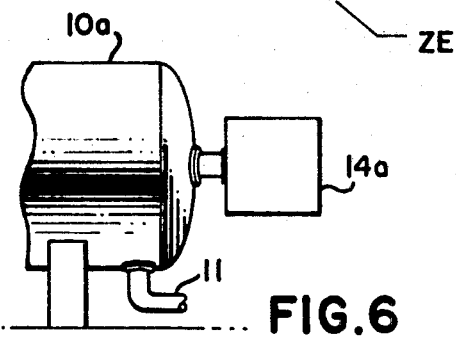
FIG. 6 shows an embodiment of this invention with the unit housing mounted on a side of the tank.

While this control is shown in FIGS. 1 and 2 as being mounted on the top of the water tank 10 it may also be mounted on the side of the tank as shown in FIGS. 3 and 6 in which case it is provided with an aspirating electrode. The housing 14a of the electrical control is supported by the member 44 on one end of the tank 10a so that the electrode 17a is positioned at the desired water level in the tank. Aspirating electrode 17a is supported by the flexible nonconducting plastic tubing 45 and one end of this electrode forms a pressuretight joint in the plastic. Plastic tube 45 also makes a pressuretight joint with the insulator 46 which is threaded into the supporting member 44. The electrode 17a is connected to the wire 16a which leads into the housing 14a of the electrical control. A suitable coil spring 47 is positioned inside of the plastic tubing 45 and extends between the insulator 46 and the electrode 17a.

The aspirating electrode is constructed so that it may not be shorted out in the tank 10a by deposition of minerals from the water upon the electrode insulator 45. This is accomplished by flexing part of the insulator 45 when the pressure in the tank increases or decreases. Since deposited minerals are brittle the constant flexing of the insulator 45 breaks off the minerals as rapidly as they are formed or deposited. Spring 47 is positioned inside of the plastic tube 45 to keep this tube from collapsing under the pressure in the tank. The tank pressure has little effect on the axial loading of the tubing because the radial force from the pressure is transmitted directly into the spring. The axial loading by the pressure acting on the end of electrode and tubing shortens the tubing and compresses the spring slightly. As the pressure rises the tubing becomes shorter and as it falls the tubing becomes longer so that any minerals deposited on it are broken off.

The air volume control housing 14 consisting of the configuration shown in FIG. 1 or the configuration shown in FIG. 2 may be mounted on the side of the tank as shown in FIG. 6 and supported thereon by a suitable fitting such as indicated at 44 in FIG. 3. In this case the apparatus in housing 14a is identical with that in housing 14 except that member 44 replaces members 12 and 13. Also electrode 17a and supports 45, 46 and 47 thereof and connection 16a thereto replace electrode 17 and connection 16 thereto and support 15 thereof.

The circuit shown in FIG. 4 is employed in all of the embodiments of this device shown in FIGS. 1, 2, 3 and 6. In the apparatus shown in FIGS. 1 and 2 the circuit between the probe electrodes 17 and the tank 10 is closed by the water in the tank contacting the probe electrode 17 thereby providing a path for the electric current between this probe electrode and the tank. A similar action takes place in the device shown in FIG. 3 in which the probe electrode 17a contacts the water when the water level in the tank is high enough. Thus, the water is instrumental in closing the circuit between the electrode 17a and the tank 10a so that the gate G of the AC switch 43 is activated. When the air pressure in the tank is low and the air pressure switch is closed the compressor motor 23 is turned on to drive the air compressor and supply compressed air to the water tank when the water level reaches the probe electrode.

Figure 5:
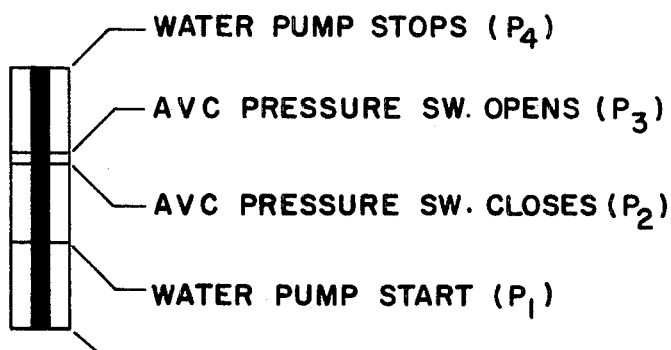
FIG. 5 is a pressure diagram employed for the purpose of explaining the operation of this invention.

In FIG. 5 we have shown a pressure diagram to illustrate the actuation pressures of the water pump pressure switch and the air pressure responsive switch. At pressure $P_1$ the water pump starts to supply water to the tank and this continues until pressure $P_4$ is reached. The air pressure switch 26 is closed at pressure $P_1$ and remains closed until pressure $P_3$ is reached. When the level of the water reaches the level of the probe electrode 17 then the AC switch 43 is turned on. With the pressure in the tank between $P_1$ and $P_3$ the air compressor motor 23 is turned on so that compressed air is supplied to the tank until the pressure reaches the value $P_3$. The water pump continues to supply water to the tank until the pressure in the tank reaches the value $P_4$. After the water pump stops, the pressure in the tank will begin to fall as water is drawn from the tank, and when the pressure reaches $P_2$ the air pressure switch 26 closes and the air compressor 23 will again be turned on provided that the water level in the tank is at or above the level of the probe electrode 17. In a practical embodiment of this invention the water pump operates over a pressure differential of 20 pounds from $P_1$ to $P_4$ while the air pressure switch is set to have a 2 pound differential between the pressures $P_2$ and $P_3$. These values are supplied as illustrating a practical embodiment and it is, of course, obvious that other pressure ranges may be used for other arrangements of this invention.

While we have shown a preferred embodiment of the invention, it will be understood that the invention is capable of variation and modification from the form shown so that the scope should be limited only by the scope of the claims appended hereto.

What we claim is:

1. In a compact self-contained unit for controlling the air volume in an hydropneumatic tank which is connected to a water pump to supply water to the tank, the combination of a housing, means supporting said housing on said tank comprising a metal threaded member attached to said housing, said metal threaded member being adapted to be attached to a threaded tubular metal member which is attached to the water tank whereby said housing may be easily attached to said tank or detached therefrom, an air pressure switch positioned in said housing, an air pressure pipe connected to said air pressure switch, said first-mentioned threaded member having a hole therethrough for receiving said air pressure pipe so that said air pressure pipe opens into said tank, a water level sensing electrode, a wire connected to said electrode supporting said electrode at a predetermined level in said tank, said electrode supporting wire being inserted into said housing through an insulator in said first mentioned member, an electric circuit in said housing connected to said electrode by said wire, another switch connected to said electric circuit, said air pressure switch and said other switch being connected in series to connect an air compressor motor to a source of current supply when the water level in said tank is at least at said predetermined level and when the air pressure in said tank is low so that said air pressure switch is closed.

2. In a compact self-contained unit for controlling the air volume in an hydropneumatic tank which is connected to a water pump to supply water to the tank, the combination as set forth in claim 1, further characterized in that said other switch comprises a semiconductor device having a gate electrode and said electric circuit comprises means connected to said sensing electrode by said wire for firing said gate electrode when the water level in said tank is at least at the level of said sensing electrode.

3. In a compact self-contained unit for controlling the air volume in an hydropneumatic tank which is connected to a water pump to supply water to the tank, the combination as set forth in claim 2, further characterized in that said means connected to said sensing electrode comprises transformer means having a winding connected to said sensing electrode by said wire, said transformer means having another winding connected to said gate electrode.

* * * * *